United States Patent
Bartlett et al.

(10) Patent No.: US 10,525,343 B2
(45) Date of Patent: Jan. 7, 2020

(54) METHOD OF USING CLOUD INFRASTRUCTURE AND VIRTUALIZATION FOR BANDWIDTH-EFFICIENT REMOTE VIDEO STREAMING OF SOFTWARE APPLICATION OPERATION BY EXECUTING COMPUTER-EXECUTABLE INSTRUCTIONS STORED ON A NON-TRANSITORY COMPUTER-READABLE MEDIUM

(71) Applicant: AAA Internet Publishing Inc., Kelowna (CA)

(72) Inventors: Robert Michael Norman Bartlett, Kelowna (CA); Alexander Edward Needham, Kelowna (CA)

(73) Assignee: AAA Internet Publishing Inc., Kelowna (CA)

( * ) Notice: Subject to any disclaimer, the term of this patent is extended or adjusted under 35 U.S.C. 154(b) by 0 days.

(21) Appl. No.: 15/335,304

(22) Filed: Oct. 26, 2016

(65) Prior Publication Data
US 2017/0043249 A1    Feb. 16, 2017

Related U.S. Application Data

(63) Continuation-in-part of application No. 14/047,678, filed on Oct. 7, 2013, which is a continuation-in-part
(Continued)

(51) Int. Cl.
*A63F 13/355*    (2014.01)
*H04L 29/06*    (2006.01)
(Continued)

(52) U.S. Cl.
CPC .......... *A63F 13/355* (2014.09); *A63F 13/213* (2014.09); *A63F 13/79* (2014.09);
(Continued)

(58) Field of Classification Search
CPC ...... A63F 13/355; A63F 13/23; H04L 45/302; H04L 45/306; H04L 67/38
(Continued)

(56) References Cited

U.S. PATENT DOCUMENTS

| | | | | |
|---|---|---|---|---|
| 7,730,157 B2* | 6/2010 | Baratto | ..................... | G06F 3/14 709/217 |
| 2001/0052008 A1* | 12/2001 | Jacobus | .............. | H04L 12/1818 709/223 |

(Continued)

OTHER PUBLICATIONS

Office Action issued in U.S. Appl. No. 14/047,678 dated Oct. 3, 2018 [Provided in IFW; Related Application].
(Continued)

*Primary Examiner* — Nicholas R Taylor
*Assistant Examiner* — Meng Vang
(74) *Attorney, Agent, or Firm* — Venable LLP; Michele V. Frank (57) ABSTRACT

A method of using cloud infrastructure and virtualization for bandwidth-efficient remote video streaming of software application operation allows end users to stream their interaction with a software application on their computer, video gaming software applications in particular, to viewers while requiring minimal bandwidth to do so. User input and relevant application data is sent from the client computer to a remote server, which uses a thin client to mirror the software and produce a rendered video from the received data. The remote server then sends the rendered application video to viewers.

12 Claims, 7 Drawing Sheets

Related U.S. Application Data of application No. 14/066,277, filed on Oct. 29, 2013, now Pat. No. 9,571,359, said application No. 15/335,304 is a continuation-in-part of application No. 14/731,286, filed on Jun. 4, 2015, now Pat. No. 9,614,870, said application No. 15/335,304 is a continuation-in-part of application No. 14/812,968, filed on Jul. 29, 2015, now Pat. No. 9,729,504.

(60) Provisional application No. 62/246,304, filed on Oct. 26, 2015, provisional application No. 62/246,397, filed on Oct. 26, 2015, provisional application No. 61/710,026, filed on Oct. 5, 2012, provisional application No. 61/720,232, filed on Oct. 30, 2012, provisional application No. 62/007,787, filed on Jun. 4, 2014, provisional application No. 62/030,384, filed on Jul. 29, 2014.

(51) Int. Cl.
| | | |
|---|---|---|
| *A63F 13/213* | (2014.01) | |
| *A63F 13/86* | (2014.01) | |
| *A63F 13/79* | (2014.01) | |
| *H04L 12/725* | (2013.01) | |
| *H04L 29/08* | (2006.01) | |
| *H04L 12/715* | (2013.01) | |

(52) U.S. Cl.
CPC ............ *A63F 13/86* (2014.09); *H04L 45/302* (2013.01); *H04L 45/306* (2013.01); *H04L 67/38* (2013.01); *H04L 45/04* (2013.01); *H04L 67/306* (2013.01)

(58) Field of Classification Search
USPC .......................................................... 709/233
See application file for complete search history.

(56) References Cited

U.S. PATENT DOCUMENTS

| | | | | |
|---|---|---|---|---|
| 2006/0244818 | A1* | 11/2006 | Majors | H04L 12/1822 348/14.08 |
| 2008/0056586 | A1* | 3/2008 | Cheng | H04N 19/527 382/232 |
| 2009/0282127 | A1* | 11/2009 | Leblanc | H04L 47/822 709/219 |
| 2011/0197132 | A1* | 8/2011 | Escoda | H04L 67/38 715/733 |
| 2011/0202656 | A1* | 8/2011 | Gentile | G06F 9/54 709/226 |
| 2011/0296303 | A1* | 12/2011 | Duquene | H04L 67/1095 715/704 |
| 2012/0190444 | A1* | 7/2012 | Fujisawa | A63F 13/10 463/31 |
| 2012/0314077 | A1* | 12/2012 | Clavenna, II | H04N 21/2187 348/159 |

OTHER PUBLICATIONS

Advisory Action issued in U.S. Appl. No. 14/047,678 dated Nov. 26, 2018 [Provided in IFW; Related Application].

Office Action issued in U.S. Appl. No. 15/335,308 dated Jan. 4, 2019 [Provided in IFW; Related Application].

* cited by examiner

METHOD OF USING CLOUD INFRASTRUCTURE AND VIRTUALIZATION FOR BANDWIDTH-EFFICIENT REMOTE VIDEO STREAMING OF SOFTWARE APPLICATION OPERATION BY EXECUTING COMPUTER-EXECUTABLE INSTRUCTIONS STORED ON A NON-TRANSITORY COMPUTER-READABLE MEDIUM

This Application claims priority to U.S. Provisional Application No. 62/246,304 filed Oct. 26, 2015 and U.S. Provisional Application No. 62/246,397 filed Oct. 26, 2015 and is a Continuation-in-Part of U.S. patent application Ser. No. 14/047,678 filed Oct. 7, 2013, which claims priority to U.S. Provisional Application No. 61/710,026 filed Oct. 5, 2012. This Application is a Continuation-in-Part of U.S. patent application No. 14/066,277 filed Oct. 29, 2013, which issued as U.S. Pat. No. 9,571,359 on Feb. 14, 2017, which claims priority to U.S. Provisional Application No. 61/720,232 filed Oct. 30, 2012. This Application is a Continuation-in-Part of U.S. patent application Ser. No. 14/731,286 filed Jun. 4, 2015, which issued as U.S. Pat. No. 9,614,870 on Apr. 4, 2017, which claims priority to U.S. Provisional Application No. 62/007,787 filed Jun. 4, 2014. This Application is Continuation-in-Part of U.S. patent application Ser. No. 14/812,968 filed Jul. 29, 2015, which issued as U.S. Pat. No. 9,729,504 on Aug. 8, 2017, which claims priority to U.S. Provisional Application No. 62/030,384 filed Jul. 29, 2014, the contents of which are incorporated herein in their entireties.

FIELD OF THE INVENTION

The present invention relates generally to video streaming. More particularly, the present invention relates to software virtualization for efficient video streaming.

BACKGROUND OF THE INVENTION

Currently, there are various ways to stream video online. Common use cases include streaming video content to gaming services such as Twitch, Azubu or Hitbox. Oftentimes, video streaming is also used for remote desktop access and other online applications. However, a significant challenge with streaming video is that video streaming is restricted by the Internet connection of the end user, especially when streaming large amounts of data. The large amounts of bandwidth can saturate the local connection. This makes streaming difficult or impossible for many users, dramatically reducing the size of the addressable market.

Cloud gaming is virtualization technology that uses video to stream game content to an end user with a thin client. The end user does not need to install the game to be play. Instead the content is streamed from the cloud server as video. As with streaming, this requires significant bandwidth and is only suitable for users with a high bandwidth connection. This is counter-intuitive; if a user has lots of bandwidth, they would just download and install the game. Cloud gaming is not suitable for latency sensitive data as there is significant communications lag between the client and the cloud server. This makes cloud gaming unsuitable for real-time gaming, and as a result it has not received significant market adoption.

It is therefore an objective of the present invention to introduce a method that users can utilize to overcome such problems. The proposed invention combines video streaming technology with cloud gaming virtualization technology, with an inverted architecture. This allows for more efficient bandwidth usage from the client side, particularly when streaming video from games or other situations where footage can be rendered elsewhere prior to streaming.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention. Notably, software solutions may be implemented in a variety of ways while still fulfilling similar functionality.

Figure 1:
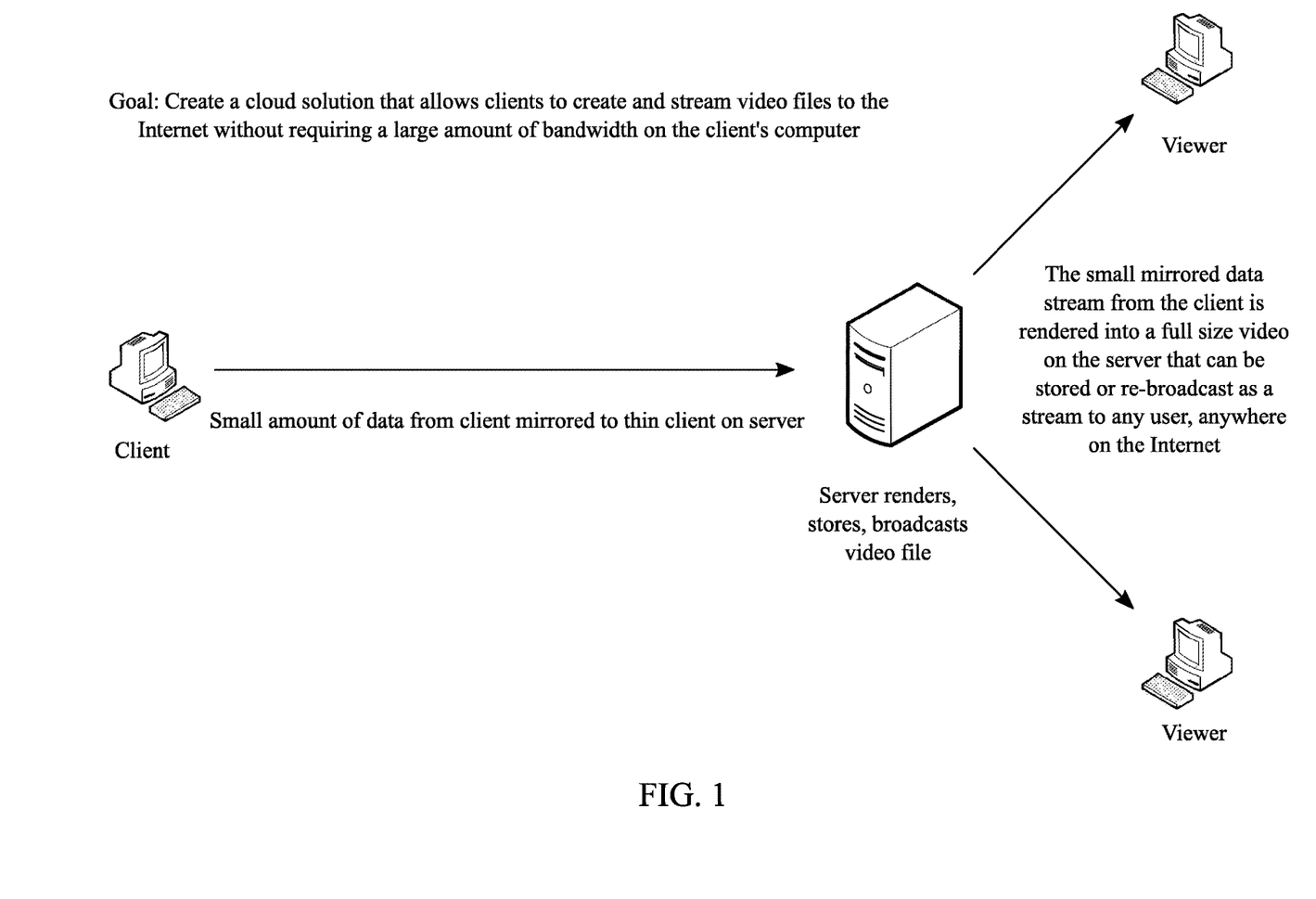
FIG. 1 is a conceptual overview of the present invention.

The present invention is a system and method to take the bandwidth-burden of video streaming off of the end user's computer, and instead stream video from a cloud server using virtualization. This will dramatically increase the global reach for streaming, and enable anyone with a limited Internet connection to be able to stream video, for any application. The present invention allows for live replay stream of data, including real-time or near-real time replay of interactive data to disparate locations. A conceptual overview of the present invention is shown in FIG. 1.

Figure 2:
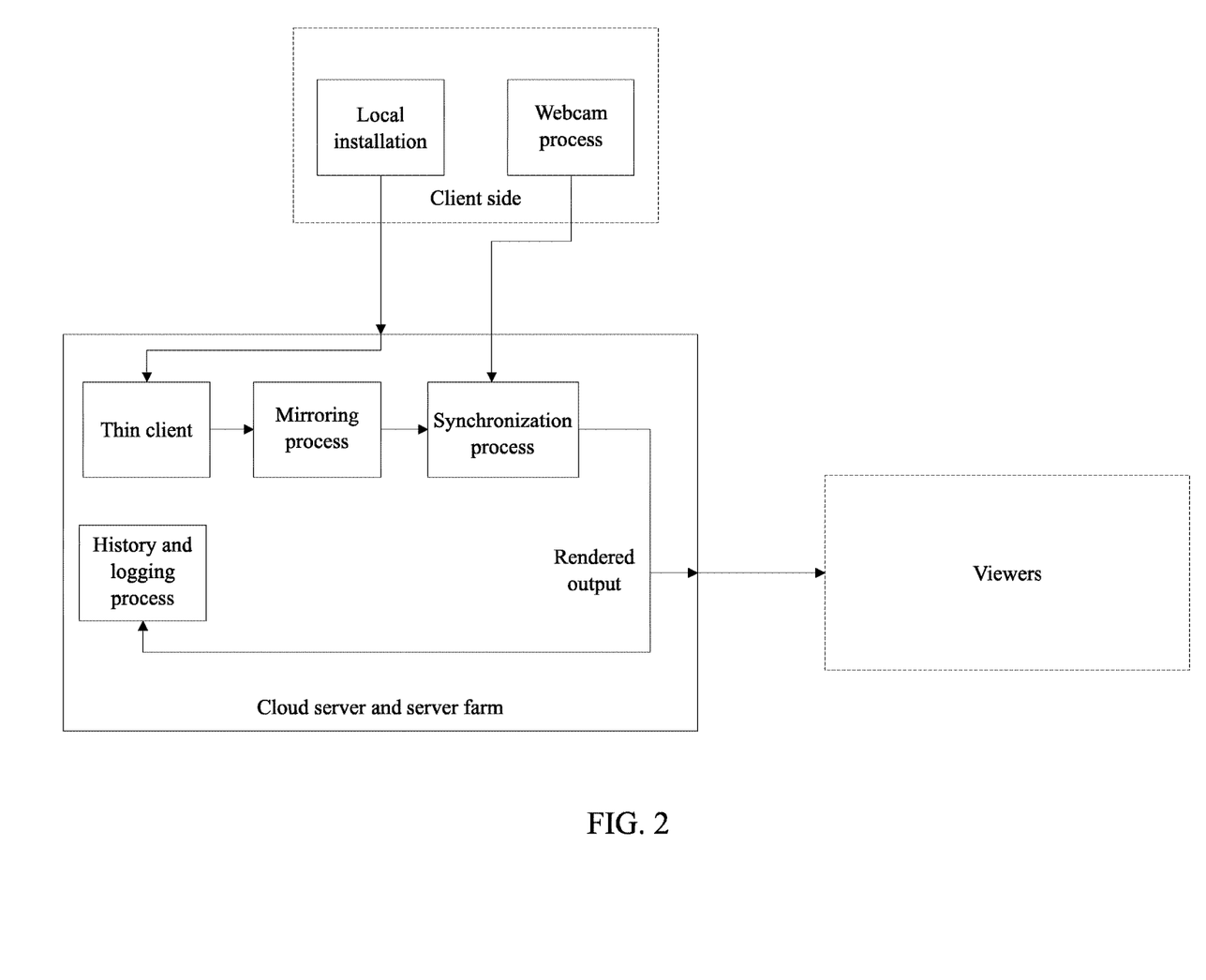
FIG. 2 is a general functional overview of the present invention.
Figure 3:
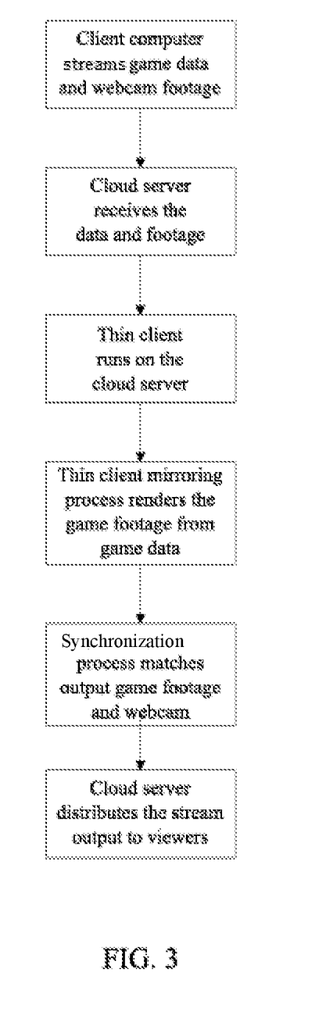
FIG. 3 is a general process flow of the present invention.

One of the main problems of current prior art is that it utilizes continual screen capture in its streaming video processes, which is considerably performance degrading for the streamer. The present invention mitigates this issue by having the client stream only game positional and similar data to a thin client on the cloud server. The cloud server then takes this data and renders the game footage exactly as it appears on the client's computer. It then integrates webcam footage from the client's computer into the stream. This minimizes the amount of bandwidth overhead from the client computer, since full-screen streaming is no longer utilized. A general functional overview of the present invention is shown in FIG. 2. A general process flow of the present invention is shown in FIG. 3.

Figure 4:
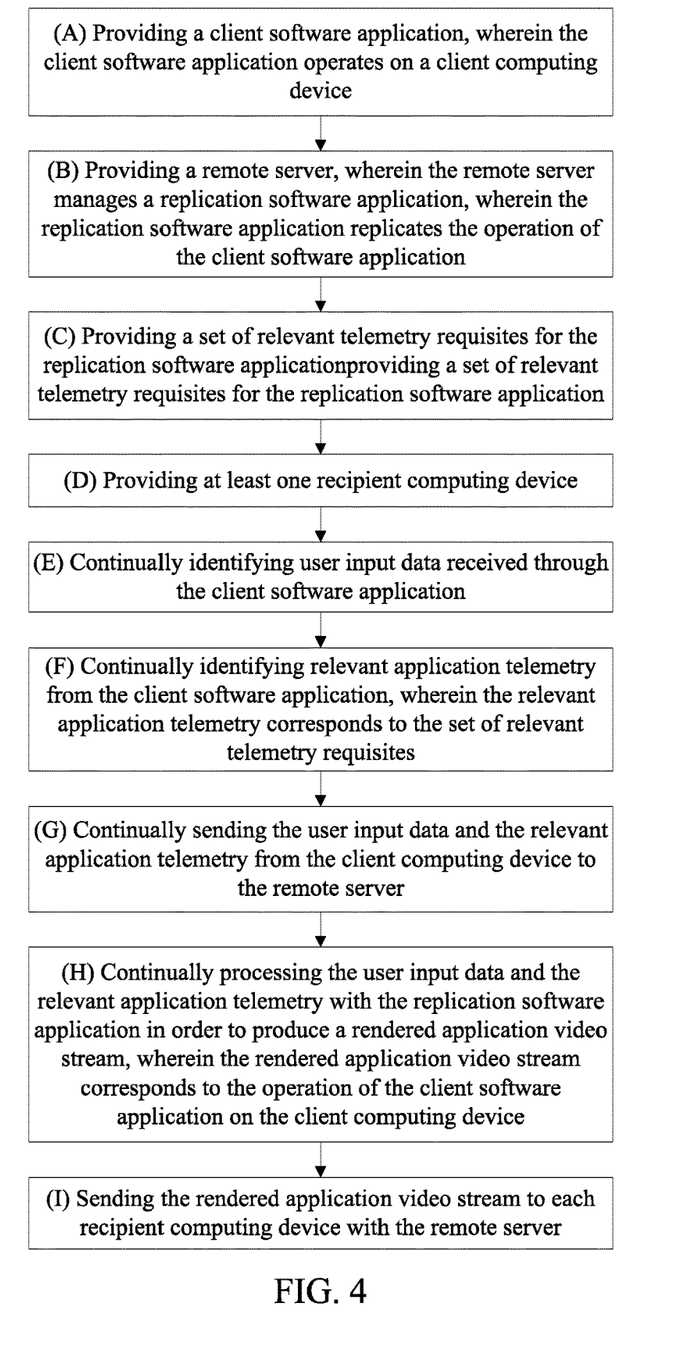
FIG. 4 is a stepwise flow diagram of the general method of the present invention.

Referring to FIG. 4, in the general method of the software application streaming system of the present invention, a client software application is provided (Step A). The client software application operates on a client computing device. In the preferred embodiment of the present invention, the client software application is a video gaming application. The primary focus of the present invention is for live streaming gameplay from a video gaming application to viewers across the Internet. However, it is noted that the present invention is also applicable for many other purposes and types of software applications, for example a remote desktop application. It is expected that every end user wishing to utilize the present invention to stream application video will have the client software application fully installed on their computing device.

A remote server is also provided (Step B). The remote server may be a single remote server, or the remote server may be understood to be a collection of cloud servers, a server farm, or any other arrangement of servers which is capable of facilitating the operation of the present invention. The remote server manages a replication software application, wherein the replication software application is capable of replicating the operation of and activity within the client software application if provided with the appropriate data regarding interactions between the user and the client software application. In one embodiment, the replication software application is a thin client of the client software application. In another embodiment, the replication software application is a fat client of the client software application. The thin client will be loaded in the cloud server, which will exactly mirror everything that happens on the client computer. Ultimately, this is comparable to flipping the traditional cloud gaming model in reverse, where the server performs the rendering instead of the client.

Furthermore, a set of relevant telemetry requisites for the replication software application is provided (Step C). The set of relevant telemetry requisites represents all the types of data required to be captured from the client software application and sent to the remote server in order to mirror the client software application with the thin client. At least one recipient computing device is also provided (Step D). Each recipient computing device represents a viewer or distributor of the streaming video produced by the client.

Figure 5:
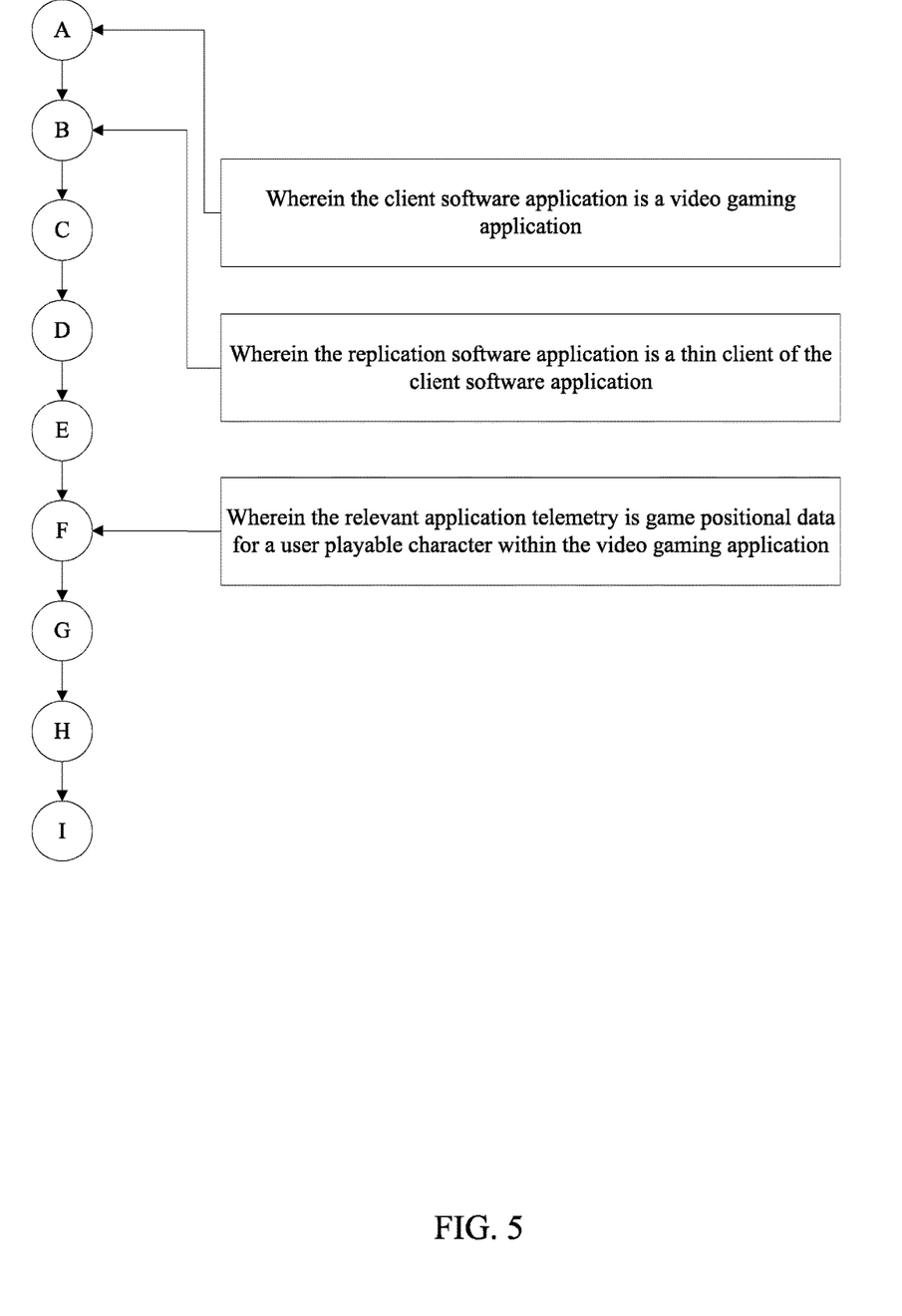
FIG. 5 is a stepwise flow diagram defining a specific application of the present invention for video gaming.

User input data received through the client software application is continually identified (Step E). Relevant application telemetry is also identified from the client software application (Step F), wherein the relevant application telemetry corresponds to the set of relevant telemetry requirements. The user input data and the relevant application telemetry is continually sent from the client computing device to the remote server (Step G). In one embodiment where the client software application is a video gaming application, the relevant application telemetry is game positional data for a user playable character within the video gaming application, as shown in FIG. 5. In various embodiments for various video gaming applications, the relevant application telemetry may be any other type of in-game data relevant to replicating the user interaction with the video gaming application. For example, if the video gaming application is a poker application, the relevant application telemetry may comprise hand contents, new cards drawn, and bet selection.

The data sent to the remote server to mirror the client application is very small compared to sending streaming video from the client computer, thus greatly improving streaming efficiency from the client computer and expanding streaming access to those with slower internet connections that typically would not be capable of streaming application video. The client computer will focus on sending data which is necessary for the thin client to know which animations were displayed on the client's computer, and any other data needed to exactly duplicate the images rendered on the client computer's screen. This may include library calls or similar information. In the invention's preferred embodiment, the mirroring process on the server may include animation, textures, maps, and other game asset libraries necessary for duplicating game footage. In alternative or future embodiments of the invention this may include sound assets such as audio effects, dialogue tracks, and music as well. Alternative or future embodiments of the present invention may include other types of pertinent data needed to render the game screen not explicitly listed here. This minimal transfer of data to the cloud server ensures that even small bandwidth connections can be mirrored. The client computer's connection will only require a minimal amount of bandwidth.

Once received by the remote server, the user input data and the relevant application telemetry are continually processed with the replication software application in order to produce a rendered application video stream (Step H). The rendered application video stream corresponds to the operation of the client software application on the client computing device. The rendered application video stream is then sent to each recipient client computing device. The recipient client computing device may be any relevant computing device that facilitates the display or distribution of the rendered application video to one or more viewers. For example, the recipient client computing device may be a video streaming service which then distributes the rendered application video to multiple viewer computing devices. Alternatively, the remote server may send the rendered application video directly to multiple viewer computing devices.

Thus, user interaction with the client software application on the client computing device is duplicated on the remote server while requiring minimal bandwidth between the client computing device and the remote server. The majority of the bandwidth required to stream application activity to one or many viewers is shouldered by the remote server, which preferably is a server farm or cloud server system with much more powerful computing capabilities and available bandwidth than the client computing device.

Figure 6:
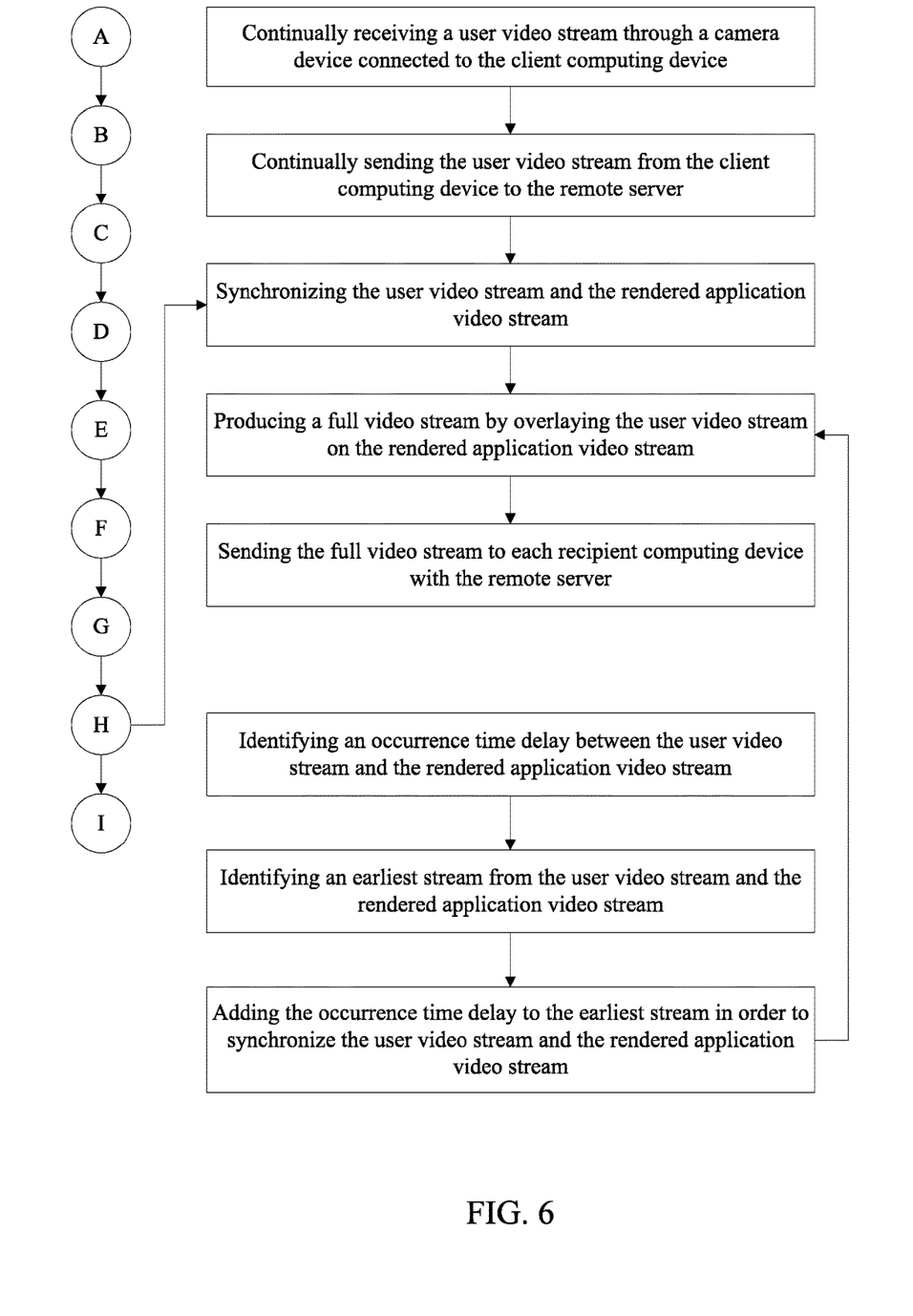
FIG. 6 is a stepwise flow diagram showing steps for streaming and synchronizing webcam footage along with the application stream.

Referring to FIG. 6, a further feature in the preferred embodiment of the present invention is a webcam streaming and synchronization function. This enables a user to live stream their in-game actions as well as a view of the user's physical actions and reactions and commentary. This may also be applicable for other types of software applications, such as, but not limited to, remote desktop applications or conferencing applications. Thus, a camera device must be connected to the client computing device and configured to interface with the client software application. A user video stream is continually received through the camera device, and the user video stream is continually sent from the client computing device to the remote server. The user video stream and the rendered application video stream are then synchronized by the remote server. A full video stream is then produced by overlaying the user video stream on the rendered application video stream. The full video stream is then sent to each recipient computing device with the remote server. It is contemplated that various means may be utilized to accomplish the synchronization process.

In the invention's preferred embodiment, the process purposely introduces a deliberate video streaming delay, matched to synchronize with the actions of the user in the webcam process. In alternative or future embodiments the synchronization process may be purposely add a delay to match the state of slowest user. Normally with traditional cloud gaming technology, the lag between client and server is a significant problem. With the present invention, because the actions of the user are occurring on the local computer, this is not a problem. Instead, the cloud server is responsible only for mirroring the client data and storing and streaming video. The storing and streaming of video from the cloud does not have to be real-time, and has no impact on the actual user experience. The storing and streaming of video could be delayed by seconds or more, and this only impacts how soon the video will be available online, in which case this delay is acceptable In one embodiment, an occurrence time delay is identified between the user video stream and the rendered application video stream. Since it may take a small period of time to render the user input data and the relevant application telemetry data, there may be a lag between a first instance of time when the user input data and the relevant application telemetry are completed being rendered and when the corresponding instance of time in the user video stream is broadcast. Therefore, an earliest stream is identified from the user video stream and the rendered application video stream. The occurrence time delay is added to the earliest stream in order to synchronize the user video stream and the rendered application in the full video stream.

Another desired function of the present invention is to store video streams for future recall. This process stores an industry-standard log of the user's games and activities. In alternative or future embodiments of the invention this may include chat logs while streaming. In addition, this process also stores the replay game data so it can be re-rendered at any time, and downloaded upon request. The download may be as a complete rendered video, or as a streaming video. In alternative or future embodiments of the invention, actual rendered video files may be stored instead of replay game data, or actual video may be stored along with the replay game data.

Figure 7:
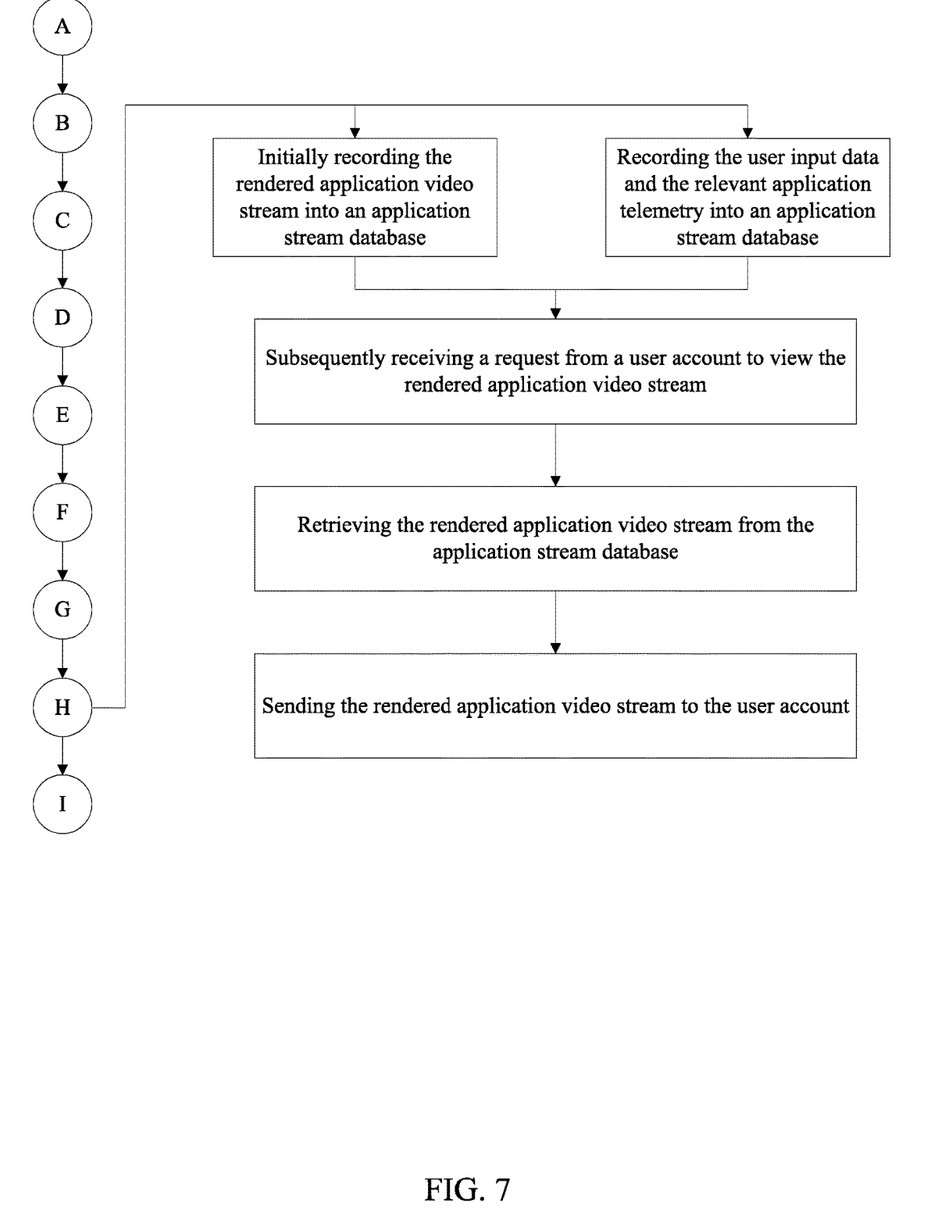
FIG. 7 is a stepwise flow diagram showing steps for storing and retrieving application streams.

Thus, in one embodiment, the rendered application video stream is initially recorded into an application stream database, as shown in FIG. 7. Subsequently, a request is received from a user account to view the rendered application video stream. The rendered application video stream is retrieved from the application stream database by the remote server, and the rendered application video stream is sent by the remote server to the computing device of the user account. In one embodiment, the rendered application video stream is not stored in the application stream database, but rather the full video stream. In one embodiment, no rendered video is recorded into the application stream database, but rather the user input data and the relevant application telemetry. Therefore, the rendered application video stream is re-rendered and streamed to the user account.

Another application of the present invention is an application-based, inverse remote desktop process. This process serves similar functionality to a remote desktop feature, but it is limited to applications which are installed on both clients.

The process' steps are as follows:

The application is installed on the remote client.

A thin client is installed on the local client, being accessed remotely. This thin client is not the same as the aforementioned, it is specifically for this process.

The first remote client launches up, and synchronizes with the second remote client to replicate the local client on the remote client. This is similar to a virtual machine in function.

To eliminate the requirement for streaming video, only applications that exist on both clients may be accessed remotely.

Instead of streaming video, only small bits of data are sent from the remote client to the local client, to properly synchronize the applications/actions on the local client. In the invention's preferred embodiment, this data comprises of application function calls and related functions, such as state changes, commands, etc.

Herein follows a summary overview of the present invention, and describes the overall process, including the interaction of the major components. The ultimate goal for the present invention is to take video streaming off of the end user's computer and instead stream video from a cloud server using virtualization. This will dramatically increase the global reach for streaming, and enable anyone with a basic Internet connection to be able to stream video, for any application.

Ultimately this is like flipping the traditional cloud gaming model in reverse. In the local installation process, it is expected that every end user will have the game or application installed on their local computer. A thin client will be loaded in the cloud server, which will exactly mirror everything that happens on the client computer.

The mirroring process takes place on the cloud server and server farm. The cloud server that is mirroring the client computer will be able to either store, as a video file or stream the video content to any provider. Since the cloud server sits in a server farm with significant amounts of bandwidth it makes streaming the video very easy, regardless of the connection that the client computer has.

In the mirroring process, the client computer only sends small amounts of data to the cloud server to mirror the client application. This ensures that even small bandwidth connections can be mirrored.

Notably, with the mirroring process, the synchronization process is needed to remedy the mismatch caused by the time needed to render the game footage.

This is interconnected with the webcam process. Because the video box is still small, the overhead of the captured rendered video is not as high as if it would be full-screen, as with the prior art.

Thus, storing and streaming of video from the cloud does not have to be real-time, and has no impact on the actual user experience. The storing and streaming of video could be delayed by seconds or more, and this only impacts how soon the video will be available online, in which case this delay is acceptable.

The optional application-based, inverse remote desktop process serves similar functionality to a remote desktop feature, but it is limited to applications which are installed on both clients.

Although the invention has been explained in relation to its preferred embodiment, it is to be understood that many other possible modifications and variations can be made without departing from the spirit and scope of the invention as hereinafter claimed.

What is claimed is:

1. A method of using cloud infrastructure and virtualization for bandwidth-efficient remote video streaming of software application operation by executing computer-executable instructions stored on a non-transitory computer-readable medium, the method comprising:

providing a client software application, wherein the client software application operates on a client computing device;

providing a replication software application, wherein the replication software application operates on a remote server computer;

providing a set of relevant telemetry requisites for the replication software application;

identifying user input data received through the client software application;

identifying relevant application telemetry from the client software application, wherein the relevant application telemetry corresponds to the set of relevant telemetry requisites, the set of relevant telemetry requisites comprising positional data in the client software application;

continually sending the user input data and the relevant application telemetry from the client computing device to the remote server;

rendering an application video stream on the remote server with the replication software application by processing the user input data and the relevant application telemetry with the replication software application, wherein the application video stream rendered on the remote server replicates client software application graphics displayed on the client computing device with the client software application including the user input data and the relevant application telemetry; and sending the rendered application video stream to a recipient computing device from the remote server, the recipient computing device being distinct from the client computing device.

2. The method of claim 1, wherein the replication software application is a thin client of the client software application.

3. The method of claim 1, wherein the client software application is a video gaming application, and wherein the relevant application telemetry is game positional data for a user playable character within the video gaming application.

4. The method of claim 1, further comprising:
continually receiving a user video stream through a camera device connected to the client computing device;
continually sending the user video stream from the client computing device to the remote server;
synchronizing the user video stream and the rendered application video stream;
producing a full video stream by overlaying the user video stream on the rendered application video stream; and
sending the full video stream to the recipient computing device with the remote server.

5. The method of claim 4, further comprising:
identifying an occurrence time delay between the user video stream and the rendered application video stream;
identifying an earliest stream from the user video stream and the rendered application video stream; and
adding the occurrence time delay to the earliest stream in order to synchronize the user video stream and the rendered application video stream.

6. The method of claim 1, further comprising:
initially recording the rendered application video stream into an application stream database;
subsequently receiving a request from a user account to view the rendered application video stream;
retrieving the rendered application video stream from the application stream database; and
sending the rendered application video stream to the user account.

7. The method of claim 1, further comprising:
recording the user input data and the relevant application telemetry into an application stream database.

8. The method of claim 1, wherein rendering the rendered application video stream on the remote server with the replication software application by processing the user input data and the relevant application telemetry with the replication software application comprises:
rendering the rendered application video stream on the remote server with the replication software application by processing only the user input data and the relevant application telemetry with the replication software application.

9. The method of claim 1, wherein the set of relevant telemetry requisites further comprise other application attributes within the client software application.

10. A method of remote video streaming of software application operation by executing computer-executable instructions stored on a non-transitory computer-readable medium comprising:
receiving a user input data from a client software application operating on a client computing device;
receiving an application telemetry from the client software application operating on the client computing device, the application telemetry comprising positional data in the client software application;
rendering an application video stream at a remote server by processing the received user input data and the received application telemetry and replicating client software application graphics displayed on the client computing device with the client software application including the user input data and the application telemetry; and
sending the rendered application video stream from the remote server to a recipient computing device, the recipient computing device being distinct from the client computing device,
wherein the user input data and the application telemetry is received by the remote server, and
wherein transmission of the user input data and the application telemetry from the client computing device to the remote server requires minimal bandwidth and transmission of a rendered application video stream by the remote server to the recipient computing device requires a majority bandwidth, the rendered application video stream being rendered by processing the user input data and the application telemetry at the remote server.

11. The method of claim 10, wherein sending the rendered application video stream from the remote server to the recipient computing device comprises sending the rendered application video stream from the remote server to a plurality of recipient computing devices, and
wherein transmission of the user input data and the application telemetry from the client computing device to the remote server requires minimal bandwidth and transmission of the rendered application video stream to each recipient computing device requires the majority bandwidth.

12. The method of claim 10, wherein the application telemetry requisites further comprise other application attributes within the client software application.

* * * * *